March 18, 1924.　　　　　　　　　　　　　　　1,487,641
J. F. F. WINNING
FASTENING FOR BAGS, TRUNKS, BOXES, AND THE LIKE
Filed Nov. 10, 1920　　　2 Sheets-Sheet 1
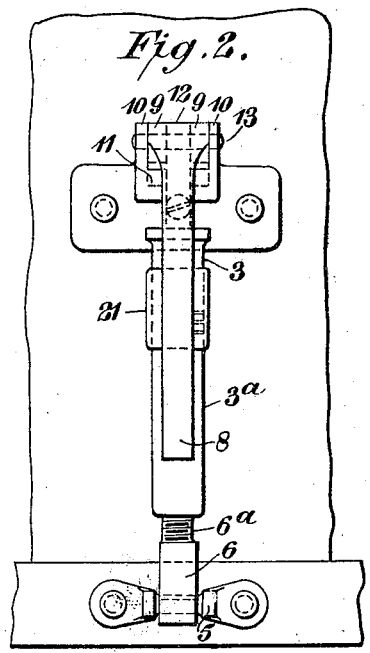
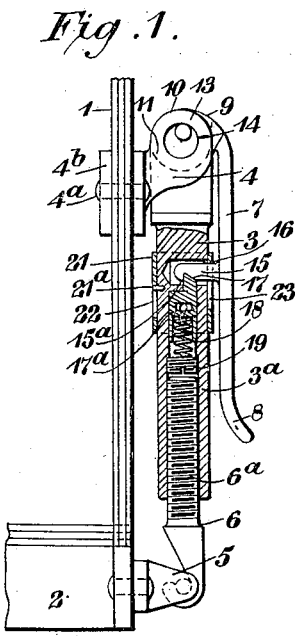
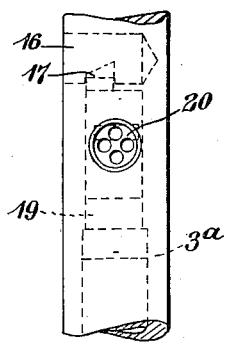
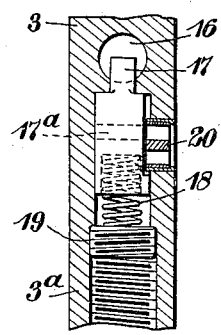
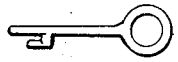
WITNESSES
INVENTOR
John F. F. Winning,
by
Attorney.

March 18, 1924.  1,487,641

J. F. F. WINNING

FASTENING FOR BAGS, TRUNKS, BOXES, AND THE LIKE

Filed Nov. 10, 1920  2 Sheets-Sheet 2

WITNESSES

INVENTOR
John F. F. Winning,
by
Attorney

Patented Mar. 18, 1924.

1,487,641

UNITED STATES PATENT OFFICE.

JOHN FREDERICK FRANKLAND WINNING, OF HANWELL, ENGLAND, ASSIGNOR TO FINNIGANS LIMITED, OF MANCHESTER, ENGLAND.

FASTENING FOR BAGS, TRUNKS, BOXES, AND THE LIKE.

Application filed November 10, 1920. Serial No. 423,103.

*To all whom it may concern:*

Be it known that I, JOHN FREDERICK FRANKLAND WINNING, a subject of the King of Great Britain, and a resident of Hanwell, in the county of Middlesex, England, have invented a new and useful Improvement in Fastenings for Bags, Trunks, Boxes, and the like, of which the following is a specification.

My invention relates to improvements in fastenings for bags, trunks, boxes and the like, of the kind comprising a link member pivotally connected to a bracket on one of the parts to be fastened and designed to be connected to a bracket or staple on the other part to be fastened. The object of my invention is to provide an improved construction of this class of fastening with a lock combined therewith. Although not limited in this respect the improved fastening is particularly adapted for securing a trunk or the like to a support or carrier such for instance as the luggage grid of an automobile vehicle.

According to the invention the link member is connected to one of the brackets through the intermediary of an eccentric lever in such a manner that when the lever is turned towards the said link, tension is applied between the brackets whereby the two parts to be fastened are drawn together. The link member and lever are also so constructed as to form between them a latching or locking device for retaining the fastening in its closed position and prevents the same from being opened by movement of said lever without operating the locking or latching device.

In order to fasten the bag, trunk, box or the like, hereinafter referred to as the bag, the eccentric lever is turned away from the connecting link and the latter is engaged with one of the brackets. The lever is then turned towards the connecting link thereby applying tension between the parts to be fastened, the final movement of the lever bringing the elements of the locking device into engagement with one another, the bolt of the lock being preferably arranged in a hollow portion of the connecting link and adapted to engage a projection formed on the lever.

Figure 5:
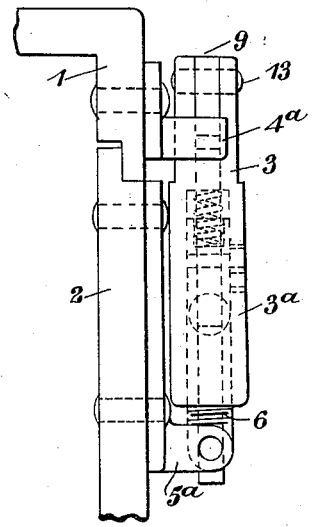
Figure 6:
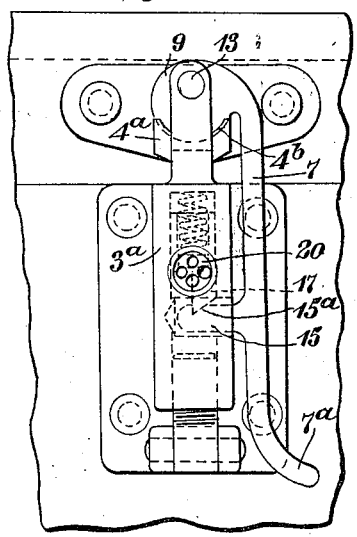

To enable my invention to be clearly understood I will now describe it with reference to the accompanying drawings, in which Fig. 1 is a side elevation partly in section of one form of the improved fastening according to my invention, Fig. 2 is a front elevation thereof, and Figs. 3 and 4 are views of details on a larger scale. Figs. 5 and 6 are respectively side and front elevations of a modified construction of my improved fastening and Fig. 7 is an illustration of a suitable form of key for the locking device.

Referring to the construction illustrated in Figs. 1 to 4 of the drawings, which is particularly adapted for securing a trunk to the luggage grid of an automobile vehicle, 1 represents a part of a bag or the like which is to be secured for example to the grid 2. 3 represents the connecting link member which is pivotally attached to the bracket 4 fixed by any suitable means such as rivets $4^a$ and a plate $4^b$ to the trunk 1, and 5 is the bracket or staple fixed on the grid 2 and designed to be engaged by a hook 6 on the end of the connecting link 3. The hook 6 is advantageously provided with a screw-threaded stem $6^a$ engaging in a screw-threaded tubular portion $3^a$ of the link 3, as shown, in order that the length of the link may be adjusted. The eccentric lever is indicated at 7 and comprises an operating handle 8 and an eccentric end 9 arranged between the jaws 10, 10 of the bracket 4 and bearing on a cylindrical portion of the latter as indicated at 11. The eccentric end portion 9 is conveniently bifurcated as shown and receives between its bifurcations the end 12 of the connecting link 3, the said end 12 being pivotally connected to the eccentric portion 9 by means of the pin 13. The latter projects beyond the side faces of the eccentric portion 9 and extends into holes 14 in the jaws 10, 10 of the bracket 4, (see Fig. 1), by which arrangement the link 3 and lever 7 are pivotally retained in the said bracket.

The handle 8 of the eccentric lever 7 is provided with a projection 15 which, when the said lever is brought into the closing position towards the link 3, enters a hole 16 in the latter and is engaged by a locking bolt 17 sliding in the tubular portion $3^a$ of the link 3 and pressed forward into its locking position by means of a spring 18, the said spring being retained in compression by means of a screw plug 19. The projection 15 is formed with a rounded end as shown and with an angular groove 15ª with which a correspondingly shaped end of the plunger 17 snaps into engagement when the projection 15 enters the hole 16. To enable the fastening to be unlocked, the bolt 17 is provided with a slot 17ª designed to be engaged by a key inserted through a perforated locking plate 20 rotatably mounted in the side of the tubular stem 3ª, the rotation of the key and the locking plate 20 causing the plunger 17 to be retracted against the pressure of the spring 18 and to release the projection 15. A suitable form of key is illustrated in Fig. 7.

The improved fastening is operated in the following manner: Assuming that it is desired to close the fastening, the lever 7 is turned upwards by means of the handle 8 thereby rotating the eccentric 9 and allowing the connecting link 3 to fall sufficiently to permit the engagement of the hook 6 beneath the bracket or staple 5. The lever 7 is then turned downwards towards the connecting link thereby rotating the eccentric in the opposite direction and raising the connecting link 3 in relation to the bracket 4 so that tension is applied between the parts 1 and 2 to be fastened together, it being assumed that the hook 6 has been already adjusted in the tubular portion 3ª of the connecting link 3 to a suitable length. The projection 15 enters the hole 16 and the bolt 17 snaps into the groove 15ª so that the bag cannot now be removed until the bolt 17 is retracted by means of the key.

Although the brackets 4 and 5 have been described and shown as attached to the lower portion of a bag and to the luggage grid respectively, it will be understood that the said brackets may if desired be attached at other places. For example, one of the brackets may be attached to the lid of the bag, thereby providing a fastening for the lid and at the same time securing the bag or trunk to the luggage grid.

To prevent dust and moisture from getting into the locking mechanism through the keyhole, the latter is protected by means of a sleeve 21 sliding on the connecting link 3 upon which it is retained by means of a pin or screw 21ª engaging in a slot 22 in the said sleeve, the said slot permitting the sleeve to be moved endways for uncovering the key plate. Another slot 23 is provided in the sleeve 21 to allow the projection 15 to enter the hole 16.

Referring to the modification illustrated in Figs. 5 and 6, which is more particularly adapted for fastening the lid or cover of a bag, trunk or the like to its body portion, the various parts of the fastening are the same as in the form already described except that the adjustable portion 6ª of the link 3 is pivoted to a bracket 5ª on one of the parts to be fastened whilst the eccentric lever 7 is pivoted to the other end of the link and is arranged detachably to engage a curved bracket 4ª secured by any suitable means to the other part to be fastened. The upper end of the connecting link 3 is bifurcated and the eccentric end portion 9 of the lever is pivotally attached between the bifurcations by means of a pin 13 in such a manner that when the lever 7 is raised, the eccentric end 9 is permitted to pass over the wall of a groove 4ᵇ in the curved bracket 4ª, whilst when the lever 7 is moved downwards towards the connecting link 3 the eccentric end 9 enters the groove and causes the bracket 4ª to be pulled towards the bracket 5ª so that the members 1 and 2 thus fastened are drawn together. The locking device is the same as in the construction first described except that the spring-pressed bolt 17 is located in the upper portion of the tubular link 3ª and projects downwardly into the hole 16, the groove 15ª being formed in the upper side of the projection 15. 20 represents the rotating key plate which is the same as in the previously described arrangement except that it is located at the front of the connecting link 3. A protecting sleeve similar to the one described in connection with Figs. 1 to 4 may also be provided, such sleeve, however, is not shown in Figs. 5 and 6. Adjustment of the length of the connecting link 3 may be obtained by detaching the eccentric end 9 from the bracket 4ª and by turning the link 3 about the screw-threaded portion 6ª. Instead of the bracket 5ª being attached to a portion of the bag as indicated at 2, it will be understood that the said bracket may be attached to the luggage grid or carrier of a motor car or other vehicle.

It will be understood that various modifications may be made in the construction of the improved fastenings without departing from the scope of the invention. For example, the provision of the screw-threaded stem 6ª for adjusting the length of the link member 3 may in some cases be dispensed with, in which cases the link 3 may be directly pivoted to the bracket 5ª or formed with a hook 6.

What I claim is:—

1. A fastening comprising a bracket on each of the members to be fastened, a link member interposed between said brackets, means for connecting one end of said link member to one of said brackets, an eccentric disc pivoted on the other end of said link member, a curved surface provided on the other bracket and adapted to receive said eccentric disc, and operating means for rotating said eccentric disc to draw the brackets together.

2. A fastening comprising a bracket on each of the members to be fastened, a link member interposed between said brackets, means for connecting one end of said link member to one of said brackets, an eccentric disc pivoted on the other end of said link member, a curved surface provided on the other bracket and adapted to receive said eccentric disc, operating means for rotating said eccentric disc to draw the brackets together, and a key lock for fastening said operating means and said link member together to retain the fastening closed.

3. A fastening comprising a bracket on each of the members to be fastened, a tubular link member interposed between said brackets, means for connecting one end of said link member to one of said brackets, an eccentric disc provided on the other end of said link member, a curved surface provided on the other bracket and adapted to receive said eccentric disc, operating means for rotating said eccentric disc to draw the brackets together, a key operated locking bolt arranged in said tubular link member and a projection on said operating means for engaging said locking bolt when the fastening is closed.

4. A fastening comprising a bracket on each of the members to be fastened, a tubular link member interposed between said brackets and having an orifice therein, means for connecting one end of said link member to one of said brackets, an eccentric disc rotatably mounted on the other end of said link member, a curved surface provided on the other bracket and adapted to receive said eccentric disc, operating means for rotating said eccentric disc to draw the brackets together, a projection on said operating means adapted to enter the orifice in the tubular link member when the fastening is in the closed position, a spring pressed locking bolt arranged in said tubular link member adapted to engage the said projection and a key plate in said tubular link member to permit the insertion of a key for retracting said bolt.

5. A fastening comprising a bracket on each of the members to be fastened, a tubular link member interposed between said brackets, means for connecting one end of said link member to one of said brackets, an eccentric disc pivoted on the other end of said link member, a curved surface provided on the other bracket and adapted to receive said eccentric disc, operating means for rotating said eccentric disc to draw the brackets together and means for adjusting the length of the link member independently of said eccentric disc.

6. A fastening, comprising a bracket on each end of the members to be fastened, a link member interposed between said brackets, means for releasably connecting one end of said link member to one of said brackets, an eccentric disc rotatably mounted on the other end of said link member, a curved surface provided on the other bracket and adapted to receive said eccentric disc, means for permanently securing the end of the link member having the eccentric disc to the bracket having the curved surface, and operating means for rotating said eccentric disc to draw the brackets together.

7. A fastening comprising a bracket on each of the members to be fastened, a tubular link member interposed between said brackets and having an orifice therein, means for connecting one end of said link member to one of said brackets, an eccentric disc rotatably mounted on the other end of said link member, a curved surface provided on the other bracket and adapted to receive said eccentric disc, operating means for rotating said eccentric disc to draw the brackets together, a projection on said operating means adapted to enter the orifice in the tubular link member when the fastening is in the closed position, a spring pressed locking bolt arranged in said tubular link member adapted to engage the said projection, a key plate in said tubular link member to permit the insertion of a key for retracting said bolt, and a slotted sleeve slidably mounted on said link member for protecting said key plate from dust and moisture.

In testimony whereof I have hereunto subscribed my name this twenty second day of October 1920.

JOHN FREDERICK FRANKLAND WINNING.